US012791094B2

(12) United States Patent
Szénási et al.

(10) Patent No.: US 12,791,094 B2
(45) Date of Patent: Nov. 10, 2026

(54) DRIVE DEVICE FOR AN ELECTRIFIED VEHICLE AXLE

(71) Applicant: AUDI AG, Ingolstadt (DE)

(72) Inventors: László Zoltán Szénási, Gyor (HU); Béla Székely, Györ (HU)

(73) Assignee: AUDI AG, Ingolstadt (DE)

( * ) Notice: Subject to any disclaimer, the term of this patent is extended or adjusted under 35 U.S.C. 154(b) by 239 days.

(21) Appl. No.: 18/711,324

(22) PCT Filed: Oct. 13, 2022

(86) PCT No.: PCT/EP2022/078480
§ 371 (c)(1),
(2) Date: May 17, 2024

(87) PCT Pub. No.: WO2023/088616
PCT Pub. Date: May 25, 2023

(65) Prior Publication Data

US 2025/0012353 A1 Jan. 9, 2025

(30) Foreign Application Priority Data

Nov. 18, 2021 (DE) ..................... 10 2021 130 151.3

(51) Int. Cl.
*B60K 1/00* (2006.01)
*F16H 57/04* (2010.01)

(52) U.S. Cl.
CPC ........... *F16H 57/0476* (2013.01); *B60K 1/00* (2013.01); *F16H 57/0424* (2013.01); *B60K 2001/001* (2013.01); *B60K 2001/006* (2013.01)

(58) Field of Classification Search
CPC .... B60K 11/02; B60K 1/00; B60K 2001/001; B60K 2001/006; F16H 57/0476;
(Continued)

(56) References Cited

U.S. PATENT DOCUMENTS

2013/0019707 A1* 1/2013 Ebihara ................ B60K 7/0007 74/468
2013/0145879 A1* 6/2013 Nakamura .......... F16H 57/0441 74/467

(Continued)

FOREIGN PATENT DOCUMENTS

DE 19626867 A1 1/1998
DE 10143929 A1 3/2002

(Continued)

OTHER PUBLICATIONS

Examination Report issued on Jun. 29, 2022, in corresponding German Application No. 10 2021 130 151.3, 8 pages.

(Continued)

*Primary Examiner* — Lori Wu
(74) *Attorney, Agent, or Firm* — Maier & Maier, PLLC

(57) ABSTRACT

A drive device for an electrified vehicle axle of a vehicle, having an electric machine, which outputs via a transmission onto driveshafts, which are led to vehicle wheels of the vehicle axle, and having an oil module, which supplies the electric machine and/or the transmission with oil. The electric machine, the transmission, and the oil module are combined to form a structural unit, in which the oil module is flanged at a joining plane onto the transmission. The oil module supplies the electric machine and/or the transmission with oil via at least one supply line, and the oil can be returned from the electric machine and/or from the transmission to the oil module via at least one return line.

20 Claims, 5 Drawing Sheets

(58) Field of Classification Search
CPC ............. F16H 57/0424; F16H 57/0483; F16H 57/0495; F16H 2057/02008; F16H 2057/02034; F16H 2057/02095; B60Y 2306/03; H02K 7/116; H02K 9/19
See application file for complete search history.

(56) References Cited

U.S. PATENT DOCUMENTS

| | | | | |
|---|---|---|---|---|
| 2014/0096641 | A1 | 4/2014 | Hoshinoya et al. | |
| 2021/0402867 | A1 * | 12/2021 | Kato | B60K 6/405 |
| 2022/0286011 | A1 * | 9/2022 | Nakata | F16H 57/0424 |

FOREIGN PATENT DOCUMENTS

| | | | | |
|---|---|---|---|---|
| DE | 10305781 | B4 | 8/2010 | |
| DE | 102010041415 | A1 | 3/2012 | |
| DE | 102016000338 | A1 | 7/2017 | |
| DE | 102018222046 | A1 | 6/2020 | |
| DE | 102020125112 | A1 | 3/2021 | |
| DE | 102021125658 | A1 * | 4/2023 | H02K 7/116 |
| EP | 3199838 | A1 | 8/2017 | |

OTHER PUBLICATIONS

International Search Report and Written Opinion of the International Searching Authority issued on Jan. 24, 2023, in corresponding International Application No. PCT/EP2022/078480, 20 pages.
International Preliminary Report on Patentability issued on Feb. 27, 2024, in corresponding International Application No. PCT/EP2022/078480, 15 pages.

* cited by examiner

DRIVE DEVICE FOR AN ELECTRIFIED VEHICLE AXLE

FIELD

The invention relates to a drive device for an electrified vehicle axle of the vehicle.

BACKGROUND

An electrified vehicle axle of a two-track, electrically operated vehicle has an electric machine, which outputs via a transmission on driveshafts, which are led to vehicle wheels of the vehicle axle. Moreover, the vehicle axle has an oil supply system having an oil module, which supplies the electric machine and the transmission with oil.

In an exemplary drive device, the oil module, the electric machine, and the transmission are combined to form a structural unit. The oil module is flanged at a joining plane onto the transmission in the structural unit. Furthermore, the oil module supplies both the transmission and the electric machine with oil via supply lines. The oil is guided back to the oil module from the electric machine and from the transmission via return lines.

In the prior art, the supply lines and the return lines are installed as separate line elements in the oil supply system in a manner that requires extensive components.

A structural unit of a transmission housing produced in a composite construction is known from DE 10 2010 041 415 A1. A multistage lubrication oil pump is known from DE 103 05 781 B4. A transmission control device is known from DE 101 43 929 A1.

US 2013/145879 A1 discloses a generic drive device. An electric transmission is known from US 2013/019707 A1.

The object of the invention is to provide a drive device for an electrified vehicle axle of a vehicle, the oil supply system of which is producible with reduced component expenditure in comparison to the prior art.

SUMMARY

The invention is directed to a drive device for an electrified vehicle axle of a vehicle, which has an electric machine, a transmission, and an oil module. The oil module supplies the electric machine and the transmission with oil. Moreover, the electric machine, the transmission, and the oil module are combined to form a structural unit. The oil module is flanged at a joining plane onto the transmission in the structural unit. The oil module supplies the electric machine and the transmission with oil via at least one supply line. According to the characterizing part of claim 1, the supply line is not installed as a separate line element, but rather is formed as a channel which extends in the joining plane between the oil module and the transmission. The channel is constructed from a module-side channel segment and from a transmission-side channel segment. The two channel segments together delimit a channel cross section through which oil flows.

In a technical implementation, the oil module has a module housing, on which a pump unit, a heat exchanger, an oil filter, and an oil tank are formed or installed. These are part of an oil supply system, in which the electric machine and/or the transmission are each incorporated in a hydraulic circuit, in which oil is circulated. The module housing and the transmission housing can be designed as cast metal parts. In this case, the module-side channel segment can be formed from the same material and/or integrally on the module housing. In the same manner, the transmission-side channel segment can be formed from the same material and/or integrally on the transmission housing.

A sufficiently large channel cross section of the channel integrated between the module housing and the transmission housing is relevant for the functionality of the oil supply system. Against this background, the module-side channel segment and/or the transmission-side channel segment can have a channel bottom set back with respect to the joining plane, from which channel walls are drawn up in the direction of the joining plane up to a contact surface. In the assembled state, the contact surfaces of the channel segments facing toward one another can be in sealing contact. The sealing contact can be designed to be substantially oil-tight. A minor oil leak can possibly take place between the contact surfaces of the channel segments.

At the joining plane, a module housing wall, which is shell-shaped in particular, and a transmission housing wall, which is shell-shaped in particular, can define an intermediate space, in which the channel according to the invention extends. The module housing wall and the transmission housing wall can be connected to one another at the joining plane using a circumferential flange connection. Housing flanges of the module housing and the transmission housing are connected to one another at the flange connection, possibly with a seal element interposed. In this way, the intermediate space can be sealed to the outside in a hermetically oil-tight manner. Leakage oil emerging from the channel can therefore collect on the bottom in the intermediate space and be returned from there at a return point to the oil module. A hermetic oil seal of the channel, which is complex to manufacture, is thus not required.

In a specific embodiment, an electric machine supply line can be led from a pump unit of the oil module to the electric machine. In common practice, a heat exchanger and an oil filter can be arranged in the electric machine supply line. In this case, the electric machine supply line can be divided into a first partial line, which extends between the pump unit and the heat exchanger inlet, a second partial line, which extends between the heat exchanger outlet and the oil filter inlet, and a third partial line, which extends between the filter outlet and the electric machine. The heat exchanger can be fastened on the outside on a module housing installation surface. In contrast, the oil filter and the pump unit can be arranged in a hollow cylindrical housing section of the module housing. The oil tank can also be formed from the same material and integrally in the module housing.

The above first partial line can be formed as a channel according to the invention. This can have a flow connection to a heat exchanger inlet positioned on the housing exterior at a channel opening formed in the module housing wall. The second partial line can also be formed as a channel. This can have a flow connection to the heat exchanger outlet, which is also positioned on the housing exterior, at a channel opening located in the module housing wall. Furthermore, the channel (forming the second partial line) can open at a further channel opening into the oil filter.

In a further specific embodiment, a transmission supply line can be led from the pump unit to the transmission. The transmission supply line can be at least partially embodied as a channel according to the invention. Furthermore, the pump unit can be designed as a multistage pump having a common driveshaft, the stages of which operate both as a compression pump and as a suction pump.

BRIEF DESCRIPTION OF THE FIGURES

An exemplary embodiment of the invention is described hereinafter on the basis of the appended figures.

In the figures.

DETAILED DESCRIPTION

Figure 1:
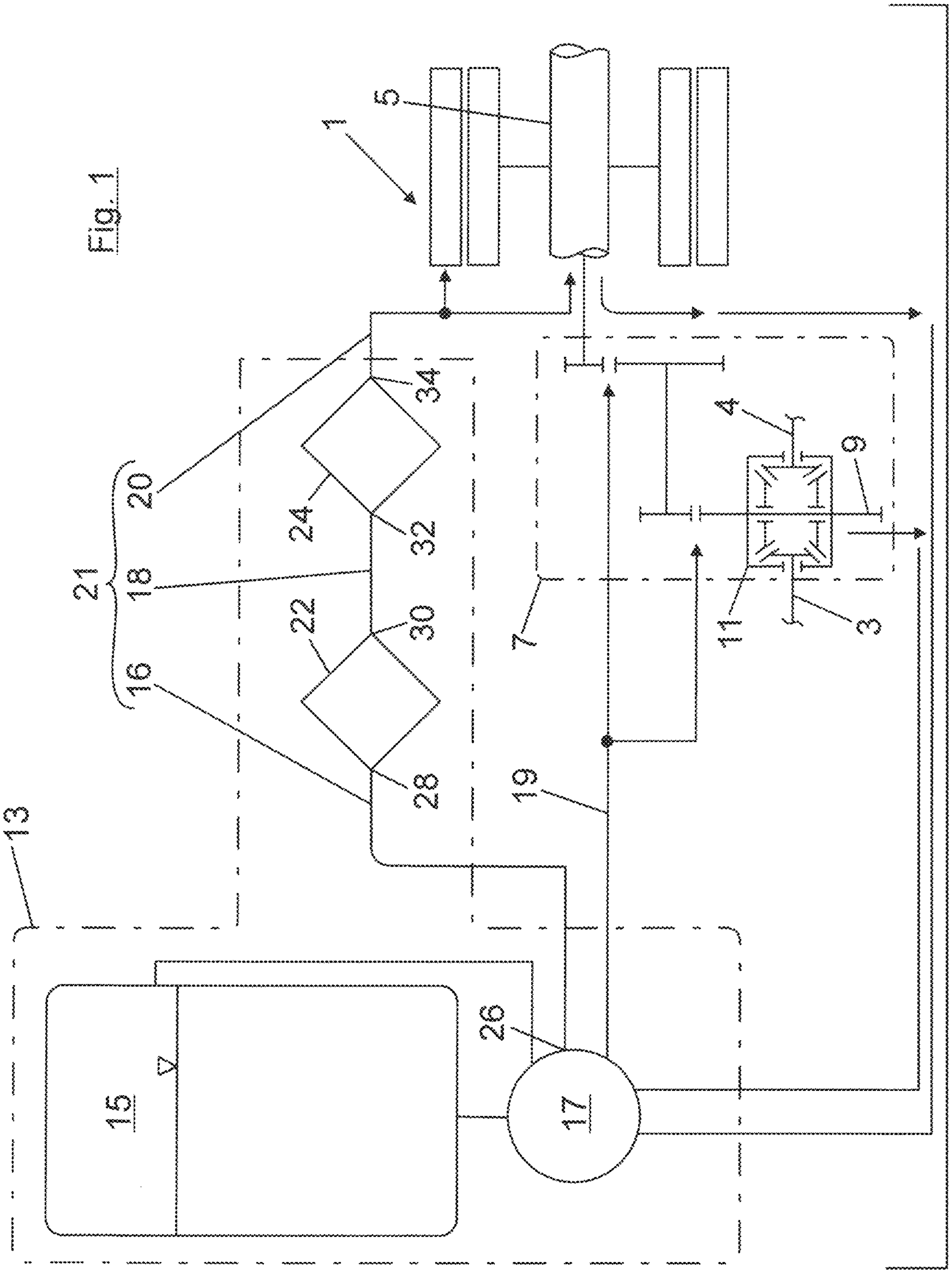
FIG. 1 shows a block diagram of a drive device for an electrified vehicle axle of a vehicle.

FIG. 1 shows a simplified block diagram of a drive device for a vehicle axle of a two-track vehicle. The vehicle axle has an electric machine 1, which is arranged in transverse installation axially parallel to the driveshafts 3, 4 led to the vehicle wheels. The rotor shaft 5 of the electric machine 1 has a drive connection via a transmission 7 to the two driveshafts 3, 4. In FIG. 1, the transmission 7 has a double spur gear stage, which has a drive connection to an input-side gear wheel 9 of an axle differential 11. The axle differential 11 outputs on both sides onto the driveshafts 3, 4 led to the vehicle wheels. Moreover, the drive device has an oil module 13, the construction of which is only described hereinafter insofar as it is required to understand the invention. Accordingly, the oil module 13 has an oil tank 15, which is connected via a suction line to a multistage pump 17. An electric machine supply line 21 leads from the multistage pump 17 to the electric machine EM, in order to supply it with oil. Oil is suctioned via a return line in the direction of multistage pump 17 from the electric machine EM. A heat exchanger 22 and an oil filter 24, which are also parts of the oil module 13, are arranged in the electric machine supply line 21.

As can furthermore be seen from FIG. 1, the electric machine supply line 21 is divided into a first partial line 16, a second partial line 18, and a third partial line 20. The first partial line 16 connects a pump outlet 26 to a heat exchanger inlet 28; the second partial line 18 connects the heat exchanger outlet 30 to the oil filter inlet 32, while the third partial line 20 connects the oil filter outlet 34 to the electric machine 1.

In addition, a transmission supply line 19 leads from the multistage pump 17 to the transmission 7. Oil is guided via the transmission supply line 19 to tooth engagement points of the transmission 7. The oil drips off from the tooth engagement points, collects in an oil sump, and is suctioned off from there via a further return line in the direction of multistage pump 17.

Figure 2:
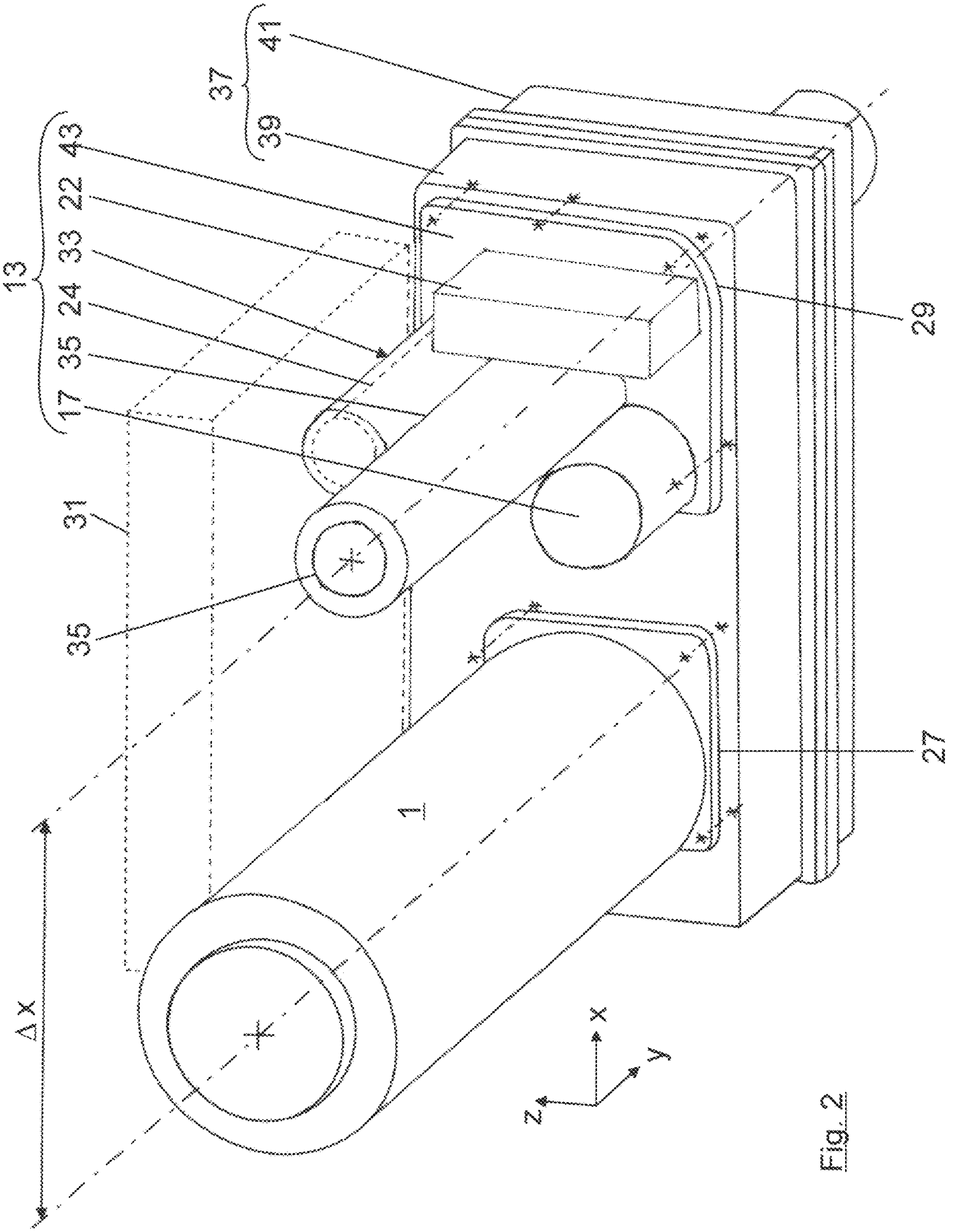
FIG. 2 shows a perspective sketch of the drive device.

In FIG. 2, the electric machine 1, the transmission 7, and the oil module 13 are combined to form a structural unit. In the structural unit, the electric machine 1 and the oil module 13 are arranged axially-parallel and spaced apart from one another over an axial distance Δx. Moreover, the electric machine 1 and the oil module 13 are flanged via flange connections 27, 29 onto the transmission 7. The electric machine 1 is assigned a power electronics unit 31 (indicated by dotted line). This is located on the upper side of the structural unit.

The oil module 13 has a module housing 33 in FIG. 2 or 3, which is embodied as a cast part, on which the multistage pump 17, the heat exchanger 22, and the oil filter 24 are installed. The oil tank 15 is integrated in the module housing 33 as an annular chamber (not shown), which delimits a shaft passage 35 in the module housing 33. A driveshaft 3, 4 (not shown) is led from the transmission 7 to one of the vehicle wheels through the shaft passage 35.

According to FIG. 2, the transmission housing 37 is constructed in two parts, having an intermediate housing 39 and a housing cover 41. The intermediate housing 39 is positioned in the axial direction between the module housing 33 and a housing cover 41. At a joining plane F (FIG. 4*a*), the module housing 33 has a flange connection 29 with a shell-shaped module housing 43 to a likewise shell-shaped transmission housing wall 45 of the intermediate housing 39, in the interior 40 of which the transmission components shown in FIG. 1 are arranged. An intermediate space 47, which is sealed hermetically oil-tight to the housing exterior by means of the circumferential flange connection 29, is defined between the module housing 43 and the transmission housing wall 45. A seal element 36 is arranged between the housing flanges of the flange connection 29 by way of example in FIG. 4*a*.

A core concept of the invention is that the supply lines 19, 21 are each formed at least partially as channels extending in the joining plane F between oil module 13 and transmission 7. Each of these channels is constructed according to FIGS. 4*a* and 4*b* from a module-side channel segment 49 and from a transmission-side channel segment 51. The two channel segments 49, 51 delimit a channel cross section through which oil flows in FIG. 4*a*. Moreover, the module-side channel segment 49 is formed from the same material and integrally on the module housing wall 43, while the transmission-side channel segment 51 is formed from the same material and integrally on the transmission housing wall 45.

Figure 3B:
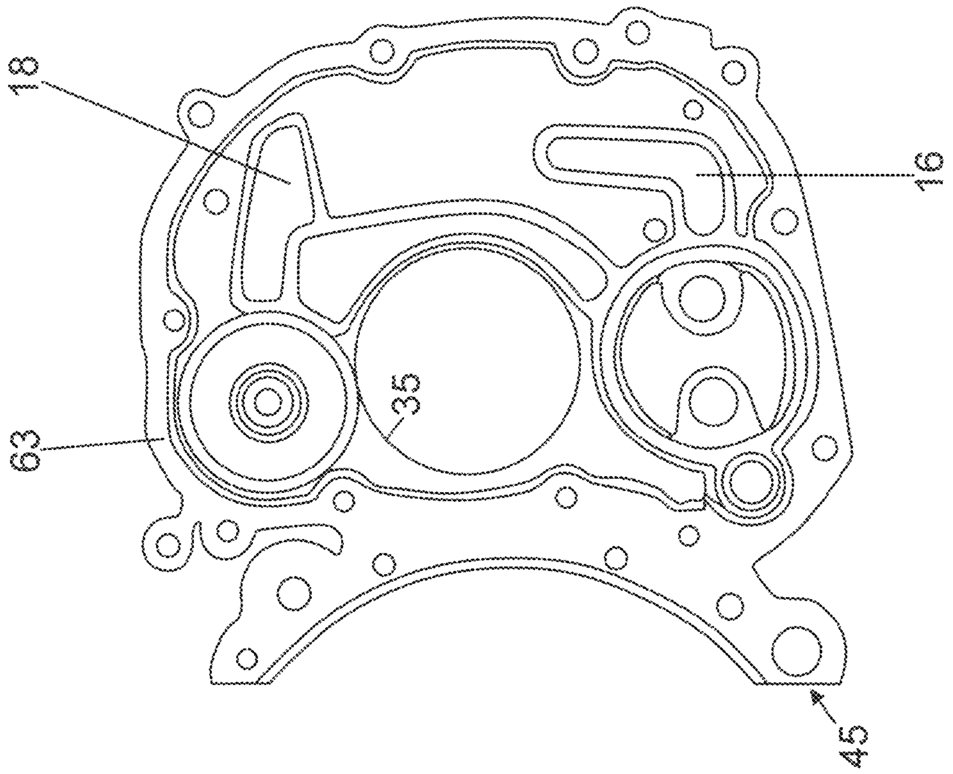
FIG. 3*b* shows a transmission housing wall.
Figure 3A:
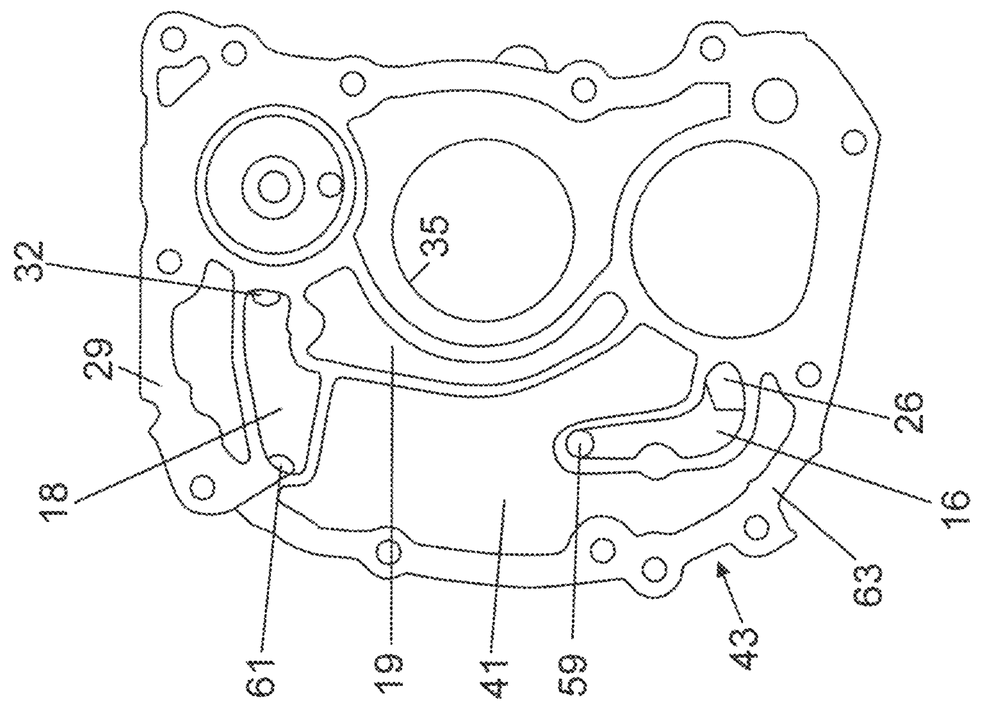
FIG. 3*a* shows a module housing wall.

According to FIGS. 3*a* and 3*b*, the first and second partial lines 16, 18 of the electric machine supply line 21 are implemented as such channels. In the same manner, the transmission supply line 19 is also implemented as a channel.

Each of the channel segments 49, 51 has a channel bottom 53 set back with respect to the joining plane F, from which channel walls 55 are drawn up in the direction of the joining plane F to a contact surface 57. In the assembled state (FIG. 4*a*), the contact surfaces 57 of the two channel segments 49, 51 facing toward one another are in sealing contact with respect to one another. The course of the first partial line 16 is shown by way of example in FIG. 4*a*. Accordingly, the first partial line 16 leads from the pump outlet 26 via the first partial line 16, formed as a channel, up to a channel opening 59, which establishes a flow connection with the heat exchanger inlet 28 of the heat exchanger 22, which is arranged on the exterior of the module housing wall 43. The second partial line 18 is also formed as a channel according to FIG. 4*a*, which has a flow connection at a channel opening 61 to the heat exchanger 30 and opens into the oil filter 24 at a further channel opening (not shown).

Figure 4A:
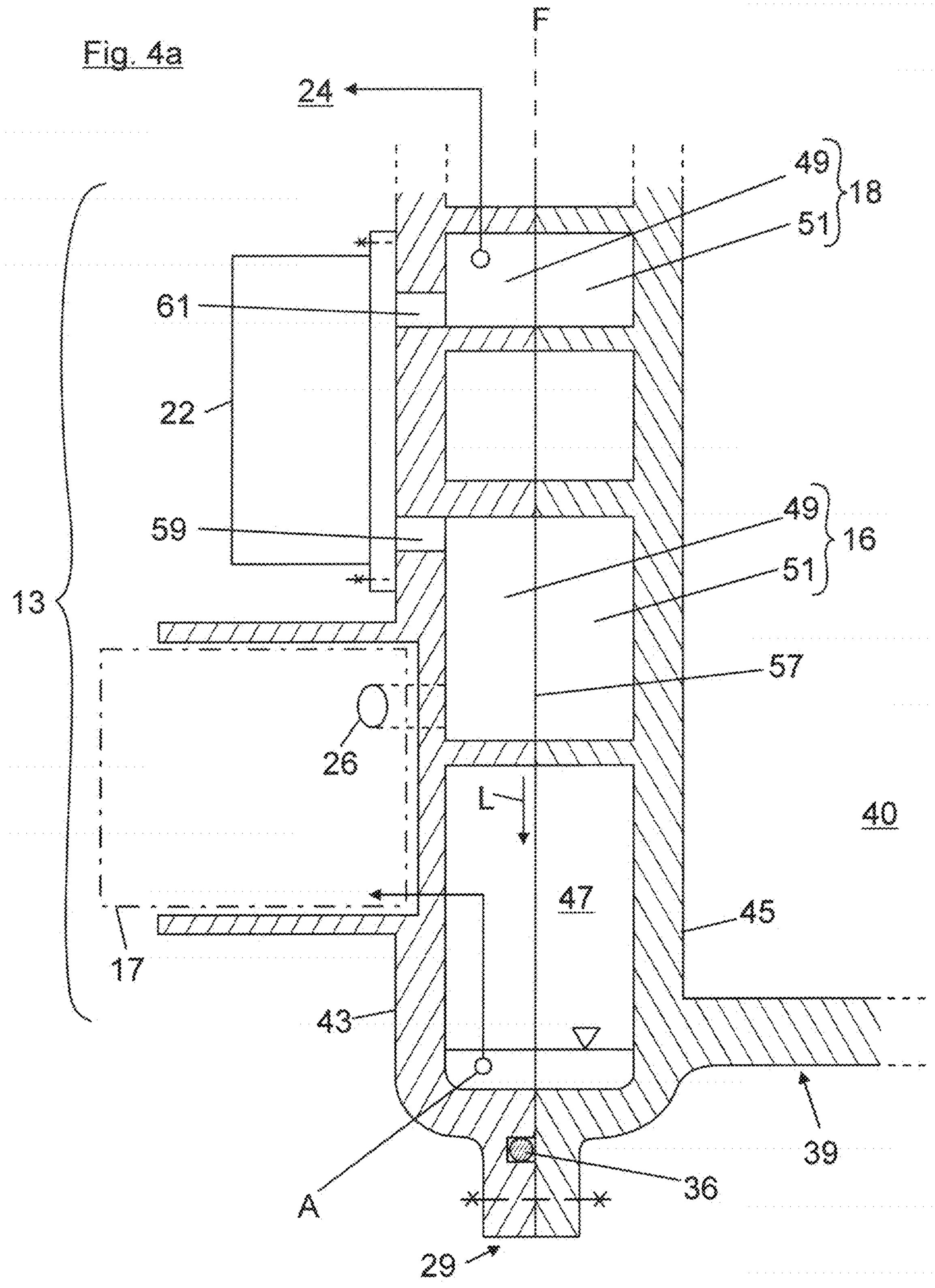
FIG. 4*a* shows a rough schematic view of the module housing wall and the transmission housing wall in the assembled.
Figure 4B:
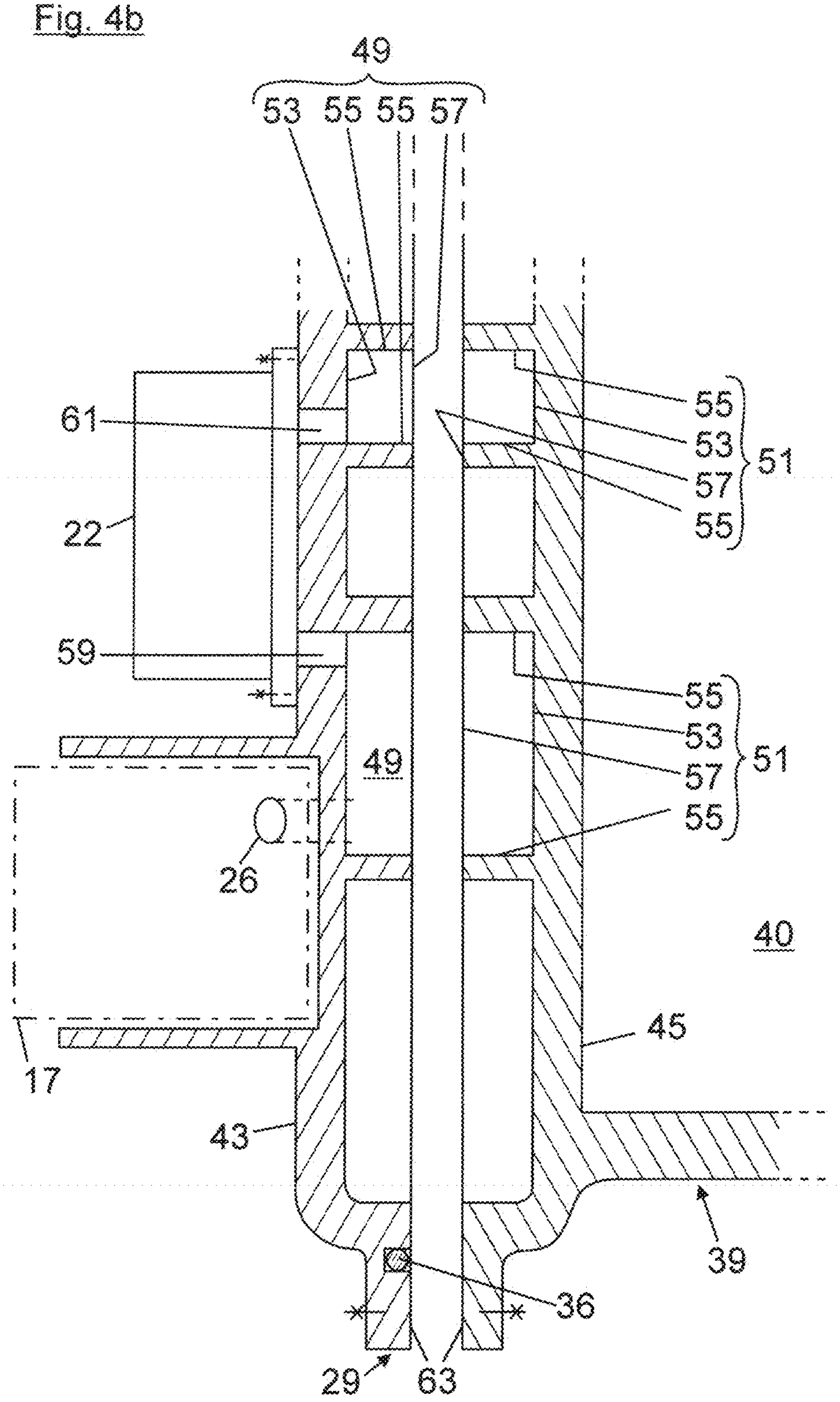
FIG. 4*b* shows a rough schematic view of the module housing wall and the transmission housing wall in the disassembled state.

According to FIG. 4*a*, the contact surfaces 57 of the channel segments 49, 51 and the contact surfaces 63 of the circumferential flange connection 29 are arranged in the same joining plane F.

As can be seen from FIG. 4*a*, leakage oil L can emerge from the partial line 16 implemented as a channel. The leakage oil L emerging from the channel can collect on the bottom in the intermediate space 47 and is returned from there at a suction point A in the direction of oil module 13.

LIST OF REFERENCE SIGNS

1 electric machine
3, 4 driveshafts

5 rotor shaft
7 transmission
9 input gear wheel
11 axle differential
13 oil module
15 oil tank
16 first partial line
17 multiple pump
18 second partial line
19 transmission supply line
20 third partial line
21 electric machine supply line
26 pump outlet
27 flange connection
28 heat exchanger inlet
29 flange connection
30 heat exchanger outlet
31 power electronics unit
32 oil filter inlet
33 module housing
34 oil filter outlet
36 seal element
37 transmission housing
39 intermediate housing
40 interior of the intermediate housing
41 housing cover
43 module housing wall
45 transmission housing wall
47 intermediate space
49 module-side channel segment
51 housing-side channel segment
53 channel bottom
55 channel walls
57 contact surface
59, 61 channel openings
63 contact surfaces of the flange connection 29
A suction point
F joining plane
L leakage oil
Δx axial distance

The invention claimed is:

1. A drive device comprising:
- an electric machine;
- a transmission; and
- an oil module, which is configured to supply at least one of the electric machine and the transmission with oil, wherein:
- the electric machine, the transmission, and the oil module are combined to form a structural unit, in which the oil module is flanged at a joining plane onto the transmission,
- the oil module is configured to supply at least one of the electric machine and the transmission with oil via at least one supply line, and
- the oil is configured to be returned from at least one the electric machine and the transmission to the oil module via at least one return line
- at least one of the at least one supply line and the at least one return line is at least partially formed as a channel extending in the joining plane between the oil module and the transmission, which is constructed from a module-side channel segment and from a transmission-side channel segment, which together delimit a channel cross section through which oil is configured to flow.

2. The drive device as claimed in claim 1, wherein the oil module further comprises:
- a module housing, on which at least one of a pump unit, a heat exchanger, an oil filter, and an oil tank are formed or installed,
- at least one of the module housing and a transmission housing are formed as cast parts, and
- the module-side channel segment and the transmission-side channel segment are each at least one of:
- formed from the same material, and
- formed integrally on the module housing and on the transmission housing.

3. The drive device as claimed in claim 2, wherein,
- at the joining plane, a module housing wall, which is shell-shaped, and a transmission housing wall, which is shell-shaped, define an intermediate space, in which the channel extends, and
- the module housing wall and the transmission housing wall are connected to one another by a circumferential flange connection, which seals off the intermediate space in an oil-tight manner to the outside.

4. The drive device as claimed in claim 3, wherein the contact surfaces of the module-side channel segment and the transmission-side channel segment and the contact surfaces of the flange connection lie jointly in the joining plane.

5. The drive device as claimed in claim 4, wherein leakage oil emerging from the channel is configured to collect on the bottom in the intermediate space and is configured to return from there via a return point to the oil module.

6. The drive device as claimed in claim 4, wherein:
- an electric machine supply line is led from the pump unit of the oil module to the electric machine,
- the heat exchanger and the oil filter are arranged in the electric machine supply line, and
- the electric machine supply line is divided into:
  - a first partial line between the pump unit and heat exchanger inlet,
  - a second partial line between heat exchanger outlet and the oil filter inlet, and
  - a third partial line between the filter outlet and the electric machine, and the heat exchanger is arranged on the exterior of the module housing.

7. The drive device as claimed in claim 3, wherein leakage oil emerging from the channel is configured to collect on the bottom in the intermediate space and is configured to return from there via a return point to the oil module.

8. The drive device as claimed in claim 7, wherein:
- an electric machine supply line is led from the pump unit of the oil module to the electric machine,
- the heat exchanger and the oil filter are arranged in the electric machine supply line, and
- the electric machine supply line is divided into:
  - a first partial line between the pump unit and heat exchanger inlet,
  - a second partial line between heat exchanger outlet and the oil filter inlet, and
  - a third partial line between the filter outlet and the electric machine, and the heat exchanger is arranged on the exterior of the module housing.

9. The drive device as claimed in claim 3, wherein:
- an electric machine supply line is led from the pump unit of the oil module to the electric machine,
- the heat exchanger and the oil filter are arranged in the electric machine supply line, and
- the electric machine supply line is divided into;
  - a first partial line between the pump unit and heat exchanger inlet,
  - a second partial line between heat exchanger outlet and the oil filter inlet, and a third partial line between the filter outlet and the electric machine, and the heat exchanger is arranged on the exterior of the module housing.

10. The drive device as claimed in claim 3, wherein;

a transmission supply line is led from the pump unit to the transmission, the transmission supply line is at least partially formed as a channel, and the pump unit is a multistage pump having a common driveshaft, the stages of which operate as a compression pump and as a suction pump.

11. The drive device as claimed in claim 2, wherein;

an electric machine supply line is led from the pump unit of the oil module to the electric machine, the heat exchanger and the oil filter are arranged in the electric machine supply line, the electric machine supply line is divided into;

a first partial line between the pump unit and heat exchanger inlet, a second partial line between heat exchanger outlet and the oil filter inlet, a third partial line between the filter outlet and the electric machine, and the heat exchanger is arranged on the exterior of the module housing.

12. The drive device as claimed in claim 11, wherein the first partial line is formed as a channel, which has a flow connection to the heat exchanger inlet at a first channel opening formed in the module housing wall.

13. The drive device as claimed in claim 12, wherein the second partial line is formed as a channel, which has a flow connection to the heat exchanger outlet at a first channel opening formed in the module housing wall and opens into the oil filter at a second channel opening.

14. The drive device as claimed in claim 11, wherein the second partial line is formed as a channel, which has a flow connection to the heat exchanger outlet at a first channel opening formed in the module housing wall and opens into the oil filter at a second channel opening.

15. The drive device as claimed in claim 2, wherein:

a transmission supply line is led from the pump unit to the transmission, the transmission supply line is at least partially formed as a channel, and the pump unit is a multistage pump having a common driveshaft, the stages of which operate as a compression pump and as a suction pump.

16. The drive device as claimed in claim 2, wherein, in an assembled state, contact surfaces of the module-side channel segment and the transmission-side channel segment are in sealing contact.

17. The drive device as claimed in claim 1, wherein, in an assembled state, contact surfaces of the module-side channel segment and the transmission-side channel segment are in sealing contact.

18. The drive device as claimed in claim 17, wherein, at the joining plane, a module housing wall, which is shell-shaped, and a transmission housing wall, which is shell-shaped, define an intermediate space, in which the channel extends, and the module housing wall and the transmission housing wall are connected to one another by a circumferential flange connection, which seals off the intermediate space in an oil-tight manner to the outside.

19. The drive device as claimed in claim 17, wherein:

an electric machine supply line is led from the pump unit of the oil module to the electric machine, the heat exchanger and the oil filter are arranged in the electric machine supply line, and the electric machine supply line is divided into;

a first partial line between the pump unit and heat exchanger inlet, a second partial line between heat exchanger outlet and the oil filter inlet, and a third partial line between the filter outlet and the electric machine, and the heat exchanger is arranged on the exterior of the module housing.

20. The drive device as claimed in claim 17, wherein;

a transmission supply line is led from the pump unit to the transmission, the transmission supply line is at least partially formed as a channel, and the pump unit is a multistage pump having a common driveshaft, the stages of which operate as a compression pump and as a suction pump.

* * * * *